United States Patent [19]
Becker et al.

[11] Patent Number: 5,802,326
[45] Date of Patent: Sep. 1, 1998

[54] METHOD AND APPARATUS FOR EFFICIENTLY UPDATING COORDINATES OF HIERARCHICAL VIEWS

[75] Inventors: Thomas W. Becker, Cupertino; Steven R. Friedrich, Placerville, both of Calif.

[73] Assignee: Apple Computer, Inc., Cupertino, Calif.

[21] Appl. No.: 435,738

[22] Filed: May 5, 1995

[51] Int. Cl.$^6$ .................................................. G06F 3/14
[52] U.S. Cl. ............................................ 395/340; 395/508
[58] Field of Search ................................. 395/130, 155, 395/119, 339–345, 508

[56] References Cited

U.S. PATENT DOCUMENTS 5,404,428   4/1995   Wu .

OTHER PUBLICATIONS

Foley, James D., et al, "Computer Graphics: Principles and Practices", *Addison–Wesley Publishing Co.*, 2nd ed. pp. 285–321, 343–345, and 435–457, 1990.

*Primary Examiner*—Joseph H. Feild
*Assistant Examiner*—Rudolph Buchel
*Attorney, Agent, or Firm*—Fenwick & West, LLP

[57] ABSTRACT

In a computer display system, data structures or views are organized in a hierarchical manner. Each view has stored therein: (1) display information; (2) information pertaining to how that view is linked to other views in the hierarchy; (3) relative coordinates; (4) global coordinates indicating where on the display the view should be drawn; and (5) a valid flag indicating whether the global coordinates are currently valid. When a view is moved, its global coordinates are no longer valid. Thus, the valid flag in the view is reset to so indicate. In addition, the valid flag of all of that view's subviews are reset (if they are not already reset). The global coordinates of the view and subviews, however, are not immediately recomputed. Rather, the global coordinates of these views are recomputed only when they are needed, such as when they are accessed for display. By storing a view's global coordinates within the view, and by updating the global coordinates only when necessary, the process of managing global coordinates is optimized.

14 Claims, 3 Drawing Sheets

METHOD AND APPARATUS FOR EFFICIENTLY UPDATING COORDINATES OF HIERARCHICAL VIEWS

FIELD OF THE INVNETION

This invention relates generally to computer displays, and more particularly to a method and apparatus for efficiently updating the coordinates of data structures for display.

BACKGROUND OF THE INVENTION

In recent years, graphical displays for computer applications have become increasingly complex. One arena in which this has been especially true is the graphical user interface (GUI) arena. For typical GUI applications now, it is quite common to see, on a single screen, a main view, one or more subviews contained within that main view, one or more subviews contained within one or more of the subviews, and perhaps even one or more subviews contained within those subviews. As displays become more and more complex, the task of efficiently organizing and managing the data structures relating to the displays becomes more and more difficult.

To simplify this management task, display data structures (also referred to as views, windows, panes, etc.) are typically organized in a hierarchical or tree-like manner. In such an organizational structure, each view in a particular hierarchy is stored as an individual data structure, with each view containing linking information to relate it to the other views in the hierarchy. The linking information in a view specifies which view (referred to as a superview) is above it in the hierarchy, and which view or views (referred to as a subview) is below it in the hierarchy. By using such a hierarchical structure, the data stored in each view is simplified, and the manipulation of the views is also simplified.

To implement such a hierarchical structure, each view typically contains, in addition to the linking information, a set of relative coordinates which specify where the view should be displayed relative to its superview (i.e. the view above it in the hierarchy). Relative rather than absolute coordinates are stored in the views so that when the superview is moved, the view moves along with the superview. When it comes time to actually display the view, absolute or global coordinates will need to be computed in order to determine where to draw the view on the display. These global coordinates are typically computed by first determining the global coordinates of a root view (a view which has no superview). Once the global coordinates of the root view are computed, the global coordinates of each view immediately below the root view is computed using the global coordinates of the root view and the view's relative coordinates. This process continues down the hierarchy. In general, the global coordinates for a particular view are calculated based on the global coordinates of the view's superview and the view's relative coordinates. Once the global coordinates are calculated for a view, the view can be displayed.

For relatively motionless displays, the issue of efficiently calculating global coordinates is not an important one. However, for situations where the views are moved on a frequent basis, such as during scrolling or drag-and-drop operations, efficient calculation of global coordinates becomes a significant concern. Currently, two methods are employed for calculating global coordinates for views. According to a first method, global coordinates are freshly calculated each time the coordinates are needed. These global coordinates are not stored within the view. A drawback of this method is that it may calculate global coordinates when such calculation is not necessary. For example, if the view has not been moved since the last time it was accessed or displayed, its global coordinates have not changed. Therefore, the same global coordinates used previously could be used this time. However, because the previous coordinates were not stored within the view, they cannot be recovered and used again. Hence, recalculation is necessary. As can be seen, this method is not optimized for efficiency.

As an alternative, a coordinate storage or caching method may be used. According to this method, the global coordinates for a view are stored within the view. Each time a view is moved, its global coordinates (along with the global coordinates of all of its subviews) are recomputed and stored back. Hence, the global coordinates for all of the views are always updated and ready to be used. While this method does minimize the need to calculate coordinates on-the-fly, it has two major drawbacks. First, for situations where view positions are changed frequently, such as during scrolling, the process of updating, storing, and retrieving the global coordinates can actually increase system overhead rather than reduce it, thereby degrading system performance. Second, this method may calculate global coordinates unnecessarily. As noted above, whenever a view is moved, its global coordinates, as well as the global coordinates of all of its subviews, are recomputed. This is done automatically, regardless of whether the view or subview is being displayed. Oftentimes, even though a view is moved and displayed, its subviews are not displayed. In fact, it is possible that the subviews are never displayed during execution of the application. If such is the case, then the global coordinates of the subviews were calculated needlessly. As this discussion shows, this second method is also not optimized for efficiency. Since neither of the current methods is optimized for efficiency, there exists a need for a method and apparatus which updates global coordinates of views in an optimized manner.

SUMMARY OF THE INVENTION

In accordance with the present invention, there are provided method and apparatus for managing hierarchical views which maintain global coordinates within a view but which update the global coordinates only when necessary. In a sense, the present invention combines the advantageous aspects of the caching and calculate-when-needed methodologies described above to derive a single optimal methodology.

In accordance with the present invention, display data structures or views are organized in a hierarchical manner. Each view in the hierarchy contains linking information specifying which view, if any, is above it in the hierarchy (referred to herein as a superview), and which view or views, if any, are below it in the hierarchy (referred to herein as a subview). In addition to the linking information, each view further includes: (1) relative coordinates indicating where the view should be positioned relative to the view's superview; (2) global or absolute coordinates indicating where on a display the view should be drawn; and (3) a valid flag indicating whether the global coordinates are currently valid. This information is used to manage and to manipulate each of the views.

The global coordinates of a view become significant when the view is moved, and when the view is accessed for display or other reasons. Whenever a view is moved, it is known that the view's global coordinates are no longer valid. Therefore, the view's valid flag is reset to indicate that the global coordinates are currently invalid. Moving a view affects not only the global coordinates of that view, but it also affects the global coordinates of all of that view's subviews. Hence, it becomes necessary to reset the valid flag for all of the view's subviews, all of those subview's subviews, and so on down the hierarchy. The invalidation process according to the present invention is thus carried out. Note that thus far, the global coordinates of the affected views have only been invalidated. They have not been recalculated.

When a view is accessed for display or other reasons, then it becomes necessary to use the view's global coordinates. At that point, a determination is made, by checking the view's valid flag, as to whether the global coordinates are valid. If so, then the coordinates are used without the need for calculation. On the other hand, if the global coordinates are currently invalid, then the coordinates are recalculated, stored back into the view, and then used.

The present invention thus provides the advantages of both of the currently known methodologies. By storing global coordinates within a view, it is not necessary to calculate the coordinates each time the view is accessed. At the same time, by recalculating invalid global coordinates only as needed, the wasteful recalculation of coordinates inherent in the conventional caching method is eliminated. Hence, the present invention provides an optimal methodology for managing and updating global coordinates of hierarchical views.

DETAILED DESCRIPTION OF THE PREFERRED EMBODIMENTS

Figure 1:
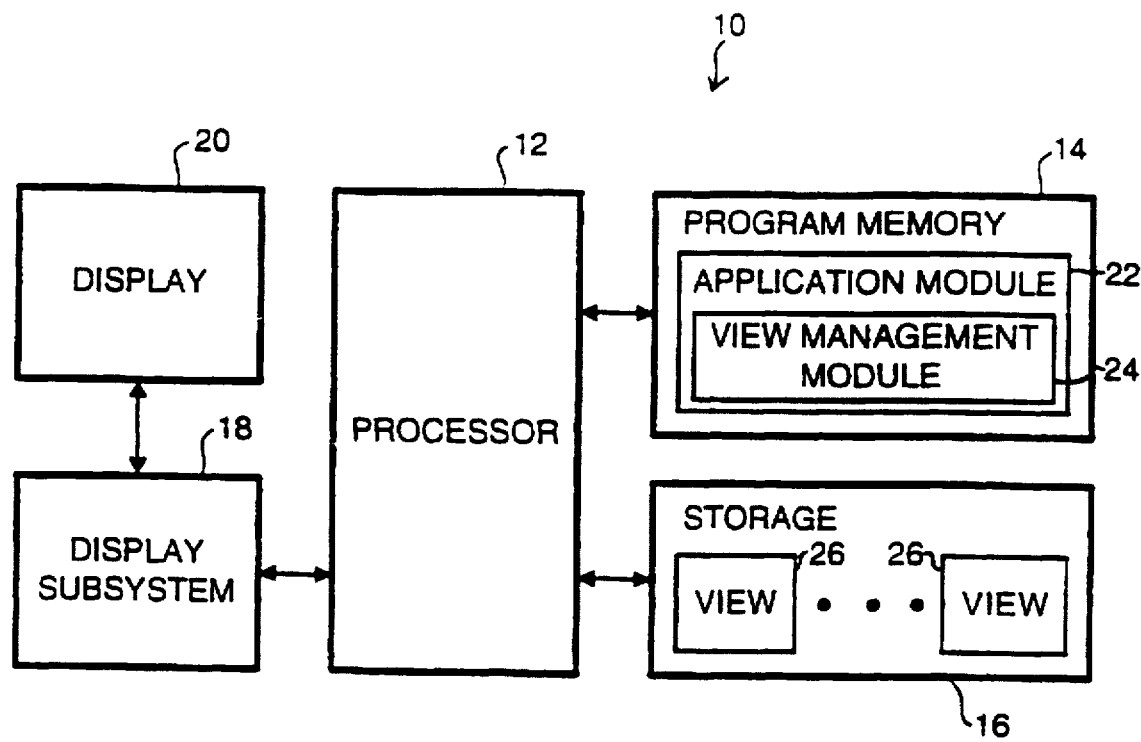
FIG. 1 is a block diagram representation of a system including the present invention.

With reference to FIG. 1, there is shown a block diagram of a system 10 wherein the present invention is implemented. The system 10 preferably comprises a processor 12, a program memory 14 coupled to the processor 12, a storage 16 coupled to the processor 12, a display subsystem 18 also coupled to the processor 12, and a display 20 coupled to the display subsystem 18. Components 12, 14, 16, 18, and 20 are preferably all standard and commercially available components. In the illustrated embodiment, memory 14 and storage 16 are shown as separate components, but memory 14 and storage 16 may be implemented as a single component.

The program memory 14 preferably has stored within it at least one application module 22. This module 22, when executed by processor 12, causes data structures or views 26 to be generated, stored within storage 16, and sent to the display subsystem 18 to be displayed on display 20. Application 22 may in general be any application, such as MacApp manufactured by Apple Computer, Inc. of Cupertino, Calif., which generates and manipulates views to be displayed. As used herein, the term "view" refers generally to a data structure wherein a chunk of display data is stored.

Whatever the application module 22 might be, it preferably includes therein the view management module 24 shown in FIG. 1. Module 24 is primarily responsible for managing access to, and updating the coordinate information contained in, the views 26 stored in storage 16. In the preferred embodiment, it is module 24 which implements the coordinate management methodology of the present invention. Module 24 will be described in greater detail in a later section.

The embodiment shown in FIG. 1 is the preferred embodiment, but as an alternative, system 10 may be implemented in such a manner that each view has its own view management module, and possibly its own associated processor. Such an architecture would be advantageous in a distributed system, such as a multi-processor system or a network of systems, wherein a plurality of systems feed display data into a single display subsystem. Such an implementation is within the scope of the present invention.

Figure 2:
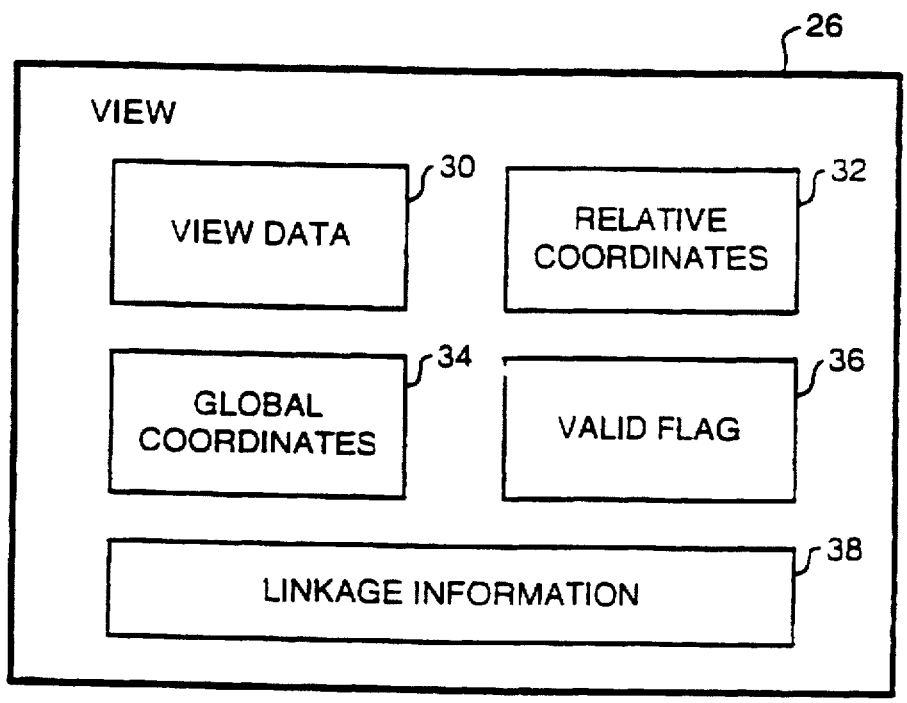
FIG. 2 is a block diagram representation of one of the data structures or views used in the present invention to show the data contents thereof.

Before describing the present invention in detail, a short discussion of the views 26 will be provided in order to facilitate a full understanding of the invention. As an initial matter, the views 26 generated by application module 22 are preferably organized in a hierarchical manner. That is, the views are preferably linked to each other to form a hierarchical tree. To simplify the storage and manipulation of these views, each view 26 is preferably stored as an individual data structure 26. The views are linked to each other by the linkage information preferably contained in each view. FIG. 2 provides a block diagram showing the preferred contents of each data structure or view 26. As shown in FIG. 2, each view contains a set of linkage information 38 which specifies how the view fits within the hierarchy. More specifically, linkage information 38 preferably specifies which view (referred to herein as a superview) is immediately above the view in the hierarchy, and which view or views (referred to herein as a subview) are immediately below the view in the hierarchy. In the preferred embodiment, each view has at most one superview, but each view may have any number of subviews.

Figure 3:
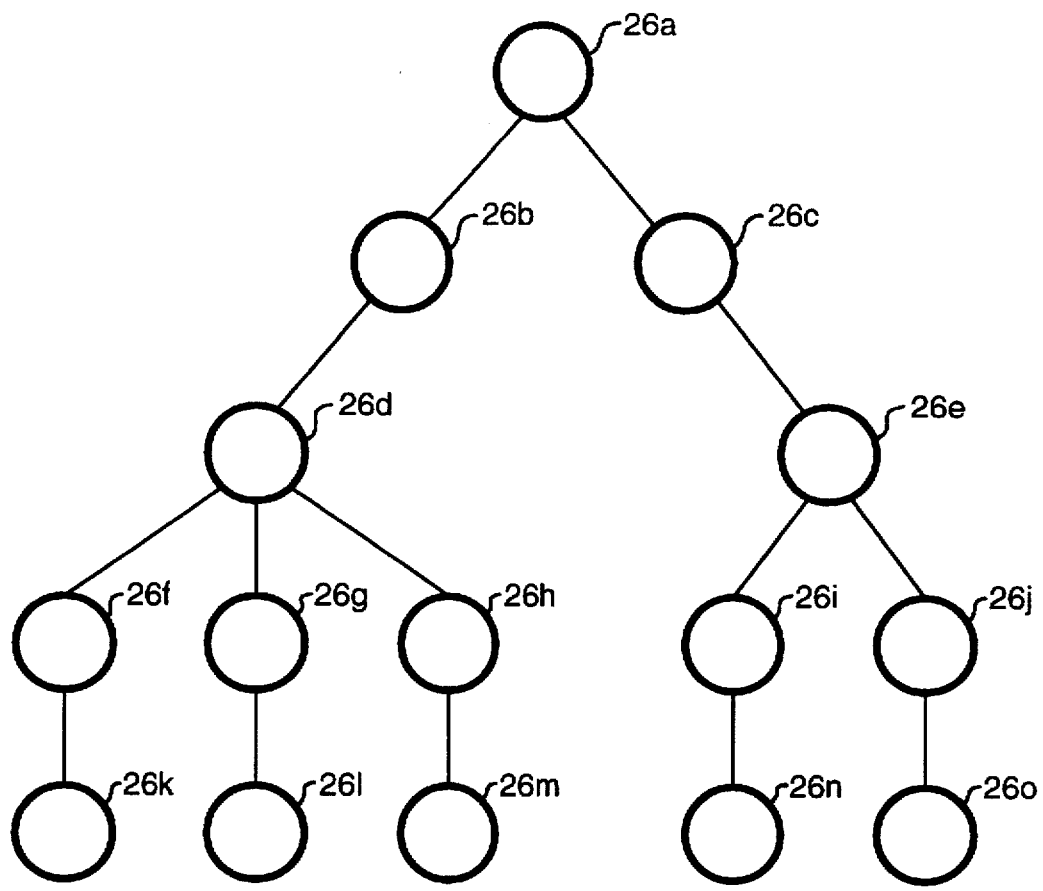
FIG. 3 is a block diagram of a sample hierarchy showing the logical linkage between the views in the hierarchy.

FIG. 3 provides a graphical representation of a sample hierarchy showing the links between the various views. As with any hierarchy, the hierarchy of FIG. 3 includes a root view 26a from which all other views branch. The root view 26a has two subviews 26b and 26c. These subviews 26b and 26c in turn have their subviews 26d and 26e, respectively. These subviews, in turn, have their subviews 26f, 26g, 26h, 26i, 26j, and so on. As shown in FIG. 3, each view may have any number of subviews, but it may have at most one superview. The sample hierarchy of FIG. 3 will be referred to again in a subsequent section.

Returning to FIG. 2, in addition to the linkage information 38, each view 26 preferably further includes at least four additional sets of information. The first set of additional data is the view data 30. The view data 30 contains most of the display data for the view, including the contents, the dimensions, the characteristics of the view. The second set of additional information is the relative coordinates 32. These coordinates 32 specify where the view is positioned relative to its superview. Because these coordinates are relative rather than absolute coordinates, they do not change as the view's superview is moved. The third set of additional information is the global or absolute coordinates 34 of the view. These coordinates specify where on the display 20 the view should be drawn. Because these coordinates 34 are absolute, they do change when either the view is moved or a view above the view in the hierarchy is moved. Hence, it is the global coordinates which are used (and possibly calculated) when the view is displayed. In general, the global coordinates 34 of a view are calculated using the global coordinates of its superview and the relative coordinates 32. The fourth set of additional information stored in the view is the valid flag 36. This flag indicates whether the global coordinates 34 are currently valid. Flag 36 provides a quick and easy scheme for determining whether recalculation of the global coordinates is necessary. The information 32, 34, 36, 38 discussed above will be used by the view management module 24 in managing the updating of the global coordinates.

As a foundation, the methodology of the present invention is based upon two underlying principles. The first principle is that, if a view's global coordinates are invalid, then the global coordinates of all of that view's subviews (and their subviews) are also invalid. The second principle is that, if a view's global coordinates are valid, then the global coordinates of all of the views above that view on the hierarchy are also valid. The methodology of the present invention enforces and relies upon these principles. These principles, in turn, contribute to the optimization of the coordinate updating process.

Figure 4:
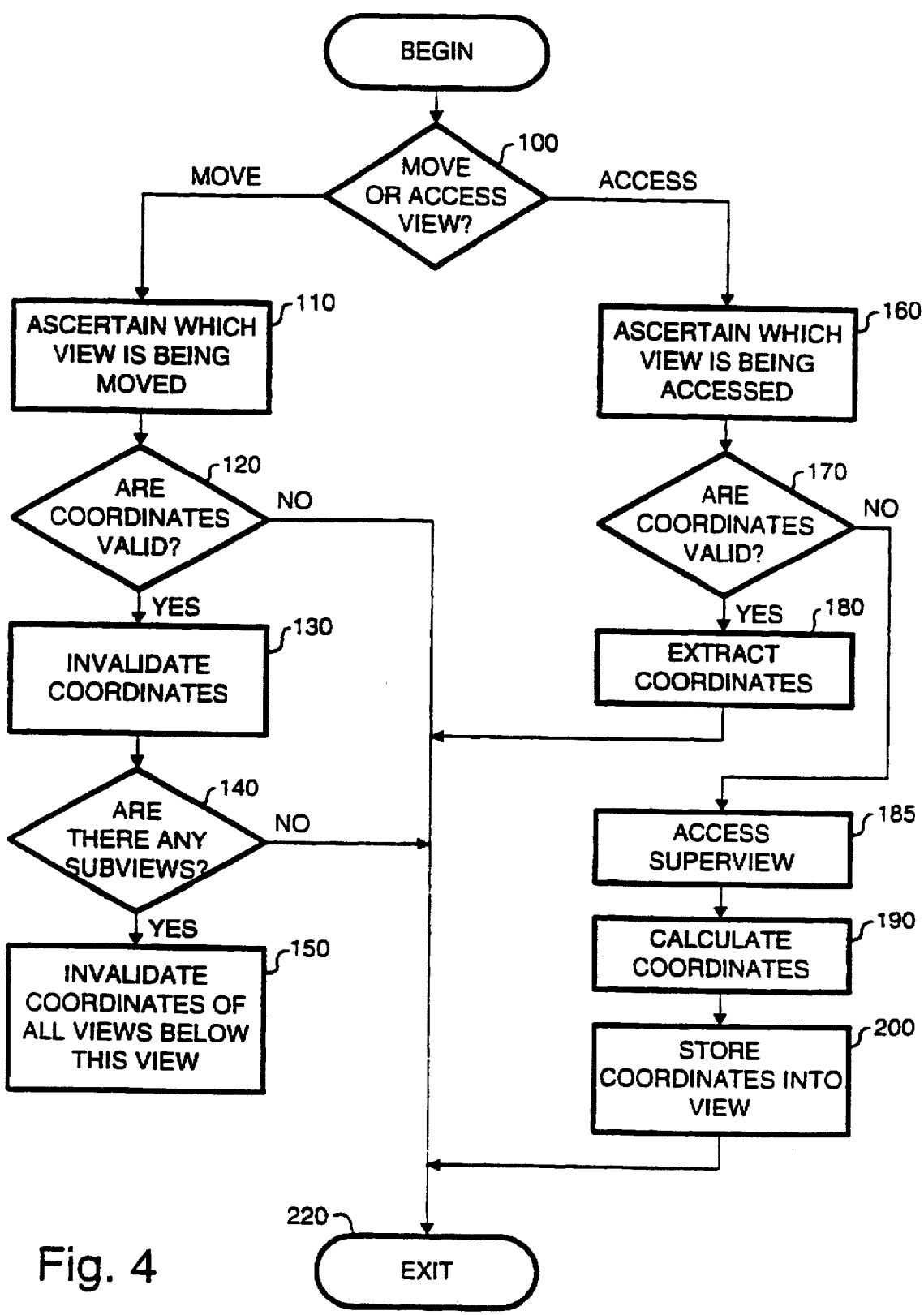
FIG. 4 is a flow diagram for the view management module shown in the system of FIG. 1.

With these principles in mind, and with reference to FIGS. 2 and 4, the view management module 24 will now be described in detail. FIG. 4 provides a flow diagram for module 24. In general, the application module 22, when executed by processor 12, is responsible for generating, storing, and manipulating the view data in each of the views 26. The view management module 24 is preferably called upon by application module 22 only when the global coordinates of the views are called into issue. There are generally two situations in which the global coordinates of a view come into play. The first situation is when a view is moved. The second situation is when a view is accessed for display or other reasons. Module 24 handles each of these situations very differently. Thus, when module 24 is invoked by application module 22, module 24 causes processor 12 to perform, as an initial step, a determination 100 as to whether a move or an access operation is desired.

Referring to the left portion of FIG. 4, if a view is being moved, then processor 12, under control of module 24, ascertains 110 which view is being moved. Once that is determined, processor 12 accesses the view that is being moved. Since it is known at this point that the view is being moved, it is also known that the view's global coordinates will no longer be valid. Hence, the valid flag 36 of the view should be reset to indicate that the global coordinates 34 are no longer valid. In doing this, processor 12 first determines 120 whether the view's global coordinates 34 are currently valid. Step 120 is preferably carried out by checking the status of the valid flag 36. If the valid flag is already reset, thereby indicating that the global coordinates are already invalid (probably due to the fact that the view had previously been moved), then there is no need to reset the valid flag a second time. In such a case, processor 12 proceeds to step 220 to exit the view management module 24 to return to the application module 22.

On the other hand, if the valid flag 36 is not already reset, then processor 12 proceeds to step 130 to invalidate the global coordinates 34 by resetting the valid flag 36. At this point, it should be noted that when a view is moved, not only are the global coordinates of that view changed but the global coordinates of all of the views below that view in the hierarchy are also changed. For example, if the view 26d shown in FIG. 3 is moved, then the global coordinates of views 26d, 26f, 26g, 26h, 26k, 26l, and 26m are changed. Thus, when a view is moved, it is not enough to just invalidate the global coordinates for that view. The global coordinates of all of the views below that view also need to be invalidated. To carry this out, processor 12 first determines 140 whether the view has any subviews. If not, then processor 12 exits module 24. However, if a view has subviews, then processor 12 invalidates 150 the global coordinates of the subviews, and the global coordinates of any views below those subviews, are invalidated. This entails the accessing of each view below the view being moved, and the resetting of the valid flag in each of those views.

This process of invalidating global coordinates in subviews is simplified by the first principle stated above that if a view's global coordinates are invalid, the global coordinates of all of that view's subviews are also invalid. A practical consequence is that, in invalidating the valid flag of a view's subviews, if a subview is encountered that already has its invalid flag reset, then it is not necessary to go further down in the hierarchy. It is known that those subviews have already had their valid flags reset. For example, suppose that view 26d of FIG. 3 is moved. This move requires that the global coordinates of views 26f, 26g, 26h, 26k, 26l, and 26m be invalidated. Now, suppose further that when view 26f is accessed, it is discovered that the valid flag of view 26f has already been reset. If such is the case, then it is not necessary to invalidate the global coordinates of view 26k. Since the valid flag of view 26f was reset, it is known that the valid flag of view 26k has already been reset. Thus, in invalidating the global coordinates of subviews, it is only necessary to go as far as the first subview having a valid flag which has been reset. This can significantly ease the burden of invalidating global coordinates of subviews, which in turn, can lead to improved system performance.

Returning to FIG. 4, after processor 12 has made sure that the global coordinates of all views below the moving view have been invalidated, processor 12 exits 220 module 24 to return to executing instructions from the application module 22. At this point, it should be noted that all that has been done in response to the movement of a view is to invalidate the global coordinates of that view and the subviews below that view. Unlike the caching method currently used, the global coordinates have not been recalculated. Global coordinates are recalculated according to the present invention only when needed. Hence, the wasteful recalculation of unnecessary global coordinates inherent in the prior art caching method is eliminated in the present invention.

Referring again to FIG. 4, invalidating global coordinates in response to moving a view is just one of the functions performed by view management module 24. Another function, shown in the left portion of FIG. 4, is to access a view for display or other purposes. In performing this function, processor 12, under control of module 24, first determines 100 that an access is indeed desired. In response to such a determination, processor 12 ascertains 160 which view is to be accessed. Thereafter, processor 12 accesses the selected view and determines 170 whether the global coordinates for that view are currently valid. Step 170 is preferably carried out by checking the status of the view's valid flag. If the valid flag indicates that the global coordinates are currently valid (i.e. the view has not been moved since the view was last accessed), then processor 12 simply extracts 180 the global coordinates from the view. There is no need to calculate the coordinates. Once the global coordinates are obtained from the view, processor 12 exits 220 module 24. The extracted coordinates may thereafter be sent to the display subsystem 18 to be used to construct the view on the display 20.

If, on the other hand, the view's global coordinates are determined to be invalid, then it becomes necessary to calculate the view's global coordinates. In carrying this out, processor 12 preferably first accesses 185 the view immediately above this view in the hierarchy (i.e. the view's superview). Thereafter, processor 12 determines whether the superview has valid global coordinates (preferably by checking the status of the superview's valid flag). If so, then based on the second principle stated above, it is known that the global coordinates of all of the views above the superview on the hierarchy are also valid. Hence, it is not necessary to go further up the hierarchy in search of valid global coordinates. Consequently, the view's global coordinates may be calculated 190 based on the superview's global coordinates and the view's relative coordinates.

On the other hand, if the superview's global coordinates are not valid, then it is necessary to proceed further up the hierarchy to the superview's superview. This process of climbing up the hierarchy continues until a view is found which has valid global coordinates. Once a view having global coordinates is found, it is known, based on the second principle, that all superviews above that view also have valid global coordinates. Hence, the global coordinates of that view may be used to calculate 190 the global coordinates of the subviews below that view. The global coordinates of the original view of interest may be calculated 190 by backtracking as set forth in the following example.

With reference to FIG. 3, suppose that view 26i is being accessed and that the global coordinates of view 26i are currently invalid. In such a case, processor 12 climbs up the hierarchy to the superview of view 26i, namely, view 26e. Suppose further that the global coordinates of view 26e are also currently invalid. If such is the case, then processor 12 climbs further up the hierarchy to view 26c. Suppose now that view 26c has valid global coordinates. According to the first principle, all views above view 26c will also have valid global coordinates. Thus, it is not necessary to go further up in the hierarchy to affirm valid global coordinates. Once a set of valid global coordinates is found, then the global coordinates of the original view of interest (view 26i) can be ascertained by backtracking. In backtracking to view 26i, the global coordinates of view 26e are first calculated. The global coordinates of view 26e are preferably calculated based on the global coordinates of view 26c and the relative coordinates of view 26e. Once this is done, the global coordinates of view 26i can be calculated 190 based on the global coordinates of view 26e and the relative coordinates of view 26i. The global coordinates of the original view of interest are thus ascertained through backtracking.

Referring again to FIG. 4, once the global coordinates of a view are calculated 190, they are preferably stored 200 within the view. This is preferably done not only for the original view of interest but for any view for which global coordinates were calculated. Thus, in the above example, new global coordinates are preferably stored into both view 26e and view 26i. Once that is done, processor 12 preferably exits 220 module 24. The newly calculated global coordinates of the view of interest may thereafter be sent to the display subsystem 18 to be used to draw the view onto the display 20. In the manner described, global coordinates of views are calculated as needed.

As an overall summary, in accordance with the methodology of the present invention, a view stores within it a set of global coordinates which specify where on a display the view should be displayed. When a view is moved, its global coordinates are invalidated. The view's global coordinates, however, are not immediately recalculated. These global coordinates are only recalculated if and when it is necessary, such as when the view is accessed for display or possibly other reasons. By storing the global coordinates within the view, the need to calculate the coordinates each and every time the view is displayed is eliminated. By updating the coordinates only when necessary, the unnecessary recalculation of coordinates is eliminated. Thus, the present invention eliminates the drawbacks of both of the prior art methodologies. Overall, a significantly improved methodology is provided.

Thus far, the invention has been described as a method and apparatus for efficiently managing the coordinates maintained within hierarchical views. While this is the preferred implementation, it is envisioned that the present invention may also be implemented in other applications using hierarchical data structures, such as in database or communications applications. These and other implementations are within the scope of the present invention.

Also, the invalidation process has thus far been described as being achieved by setting and resetting a valid flag. It should be noted that other invalidation methods may also be used. For example, instead of using a valid flag, global coordinates may be invalidated by deleting them from the view. In such a scheme, the absence of coordinates in a view would mean that the view's coordinates have been invalidated. By the same token, the presence of coordinates would mean that the coordinates are valid. This and other invalidation schemes may be used without departing from the spirit of the present invention.

What is claimed is:

1. In a display system wherein a plurality of views are organized into a hierarchy, each view containing a set of linkage information specifying how the view is linked to other views in the hierarchy, a set of display information, and a set of global coordinates representing the position of the view in a common coordinate system for the display system, a method for efficiently managing the global coordinates in said views, comprising the steps of:

determining whether one of said views is being moved;

in response to a determination that one of said views is being moved, accessing the view being moved;

determining whether the global coordinates stored in the view being moved are currently valid;

in response to a determination that the global coordinates in the view being moved are currently valid, invalidating the global coordinates in the view being moved;

maintaining, within the view being moved, an indication of the invalidity of the global coordinates;

determining whether the view being moved has a subview below it in the hierarchy;

in response to a determination that there is a subview below the view being moved, determining whether the global coordinates stored in the subview are currently valid; and in response to a determination that the global coordinates stored in the subview are currently valid, invalidating the global coordinates stored in the subview.

2. The method of claim 1, further comprising the steps of: determining whether updated global coordinates for the view being moved are needed for processing; and deriving updated global coordinates for the view being moved only if updated global coordinates are needed for processing.

3. The method of claim 2, further comprising the step of: storing the updated global coordinates into the view being moved.

4. The method of claim 2, further comprising the steps of:

in response to a determination that there is a subview below the view being moved, determining whether updated global coordinates for the subview are needed for processing; and deriving updated global coordinates for the subview only if updated global coordinates are needed for processing.

5. The method of claim 1, further comprising the step of:

maintaining, within the subview, an indication of the invalidity of the subview's global coordinates.

6. The method of claim 1, further comprising the step of:

in response to a determination that the global coordinates stored in the subview are currently invalid, determining whether the view being moved has other subviews below it in the hierarchy.

7. In a display system wherein a plurality of views are organized into a hierarchy, each view containing a set of linkage information specifying how the view is linked to other views, as set of display information, a set of relative coordinates, and a set of global coordinates representing the position of the view in a common coordinate system for the display system, a method for managing access to the global coordinates in said views, comprising the steps of:

accessing a selected view for processing;

determining whether the global coordinates stored in the selected view are currently valid;

in response to a determination that the global coordinates in the selected view are currently valid, retrieving the global coordinates from the selected view for processing;

in response to a determination that the global coordinates in the selected view are currently invalid, performing the substeps of:

accessing a superview immediately above the selected view in the hierarchy;

determining whether the global coordinates stored in the superview are currently valid; and in response to a determination that the global coordinates stored in the superview are currently valid, deriving a set of new global coordinates for the selected view using the global coordinates stored in the superview and the relative coordinates stored in the selected view; and storing the new global coordinates into the selected view.

8. The method of claim 7, further comprising the step of:

in response to a determination that the global coordinates stored in the superview are currently invalid, accessing a second superview immediately above the superview in the hierarchy.

9. The method of claim 8, further comprising the steps of:

determining whether the global coordinates stored in the second superview are currently valid;

in response to a determination that the global coordinates stored in the second superview are currently valid, deriving an updated set of global coordinates using the global coordinates stored in the second superview and the relative coordinates stored in the superview; and deriving the set of new global coordinates for the selected view using the updated global coordinates just derived and the relative coordinates stored in the selected view.

10. A display system, comprising:

a display;

a display subsystem coupled to said display for receiving display information and controlling said display;

a storage for storing a plurality of views, said views being organized into a hierarchy, each view containing a set of linkage information specifying how the view is linked to other views in the hierarchy, a set of display information, and a set of global coordinates representing the position of the view in a common coordinate system for the display system;

means for manipulating said views and conveying display information from said views to said display subsystem;

means for determining whether one of said views is being moved by said manipulating means;

means for accessing, in response to a determination that one of the views is being moved, the view being moved;

means for determining whether the global coordinates stored in the view being moved are currently valid;

means for invalidating, in response to a determination that the global coordinates in the view being moved are currently valid, the global coordinates in the view being moved;

means for maintaining, within the view being moved, an indication of the invalidity of the global coordinates;

means for determining whether the view being moved has a subview below it in the hierarchy;

means for determining, in response to a determination that there is a subview below the view being moved, whether the global coordinates stored in the subview are currently valid; and means for invalidating, in response to a determination that the global coordinates stored in the subview are currently valid, the global coordinates stored in the subview.

11. The system of claim 10, further comprising:

means for determining whether updated global coordinates for the view being moved are needed for processing; and means for deriving updated global coordinates for the view being moved, said updated global coordinates being derived only in response to a determination that updated coordinates are needed for processing.

12. The system of claim 10, wherein each view further contains a set of relative coordinates therein, and wherein said system further comprises:

means for accessing a selected view in said storage for processing;

means for determining whether the global coordinates in the selected view are currently valid;

means for retrieving, in response to a determination that the global coordinates in the selected view are currently valid, the global coordinates from the selected view for processing;

means for calculating, in response to a determination that the global coordinates in the selected view are currently invalid, a set of new global coordinates for the selected view using the relative coordinates in the selected view; and means for storing the new global coordinates into the selected view.

13. The system of claim 10, wherein each view further contains a set of relative coordinates therein, and wherein said system further comprises:

means for accessing a selected view in said storage for processing;

means for determining whether the global coordinates in the selected view are currently valid;

means for retrieving, in response to a determination that the global coordinates in the selected view are currently valid, the global coordinates from the selected view for processing;

means for accessing a superview immediately above the selected view in the hierarchy;

means for determining whether the global coordinates stored in the superview are currently valid; and means for deriving, in response to a determination that the global coordinates stored in the superview are currently valid, a set of new global coordinates using the global coordinates stored in the superview and the relative coordinates stored in the selected view.

14. The method of claim 13, further comprising:

means for accessing, in response to a determination that the global coordinates stored in the superview are currently invalid, a second superview immediately above the superview in the hierarchy;

means for determining whether the global coordinates stored in the second superview are currently valid;

means for deriving, in response to a determination that the global coordinates stored in the second superview are currently valid, an updated set of global coordinates using the global coordinates stored in the second superview and the relative coordinates stored in the superview; and means for deriving the set of new global coordinates for the selected view using the updated global coordinates just derived and the relative coordinates stored in the selected view.

* * * * *